Dec. 29, 1964   HIDEO SAGARA   3,163,183
MULTI-LAYER PIPES
Filed May 16, 1961
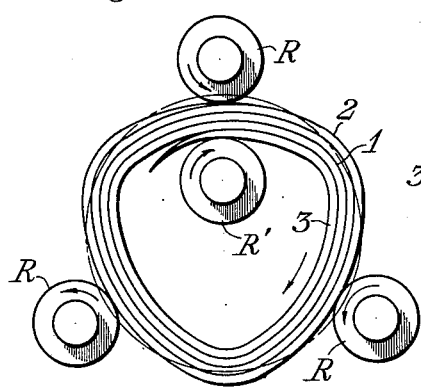
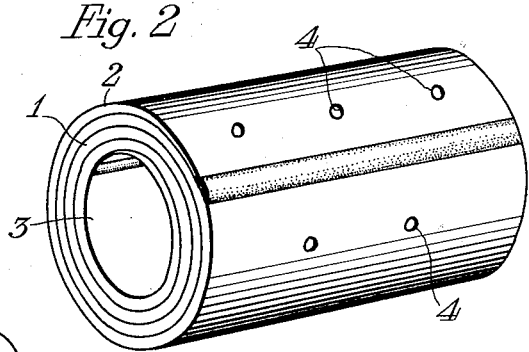
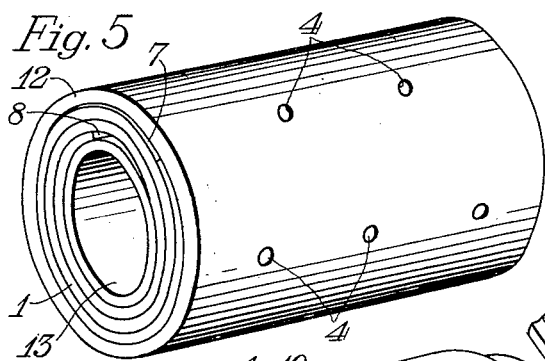
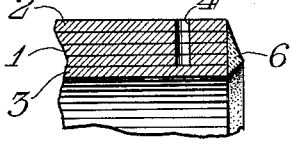
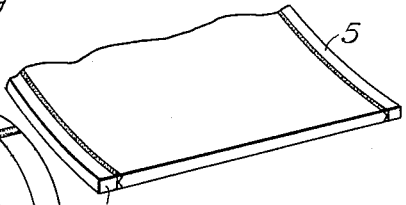
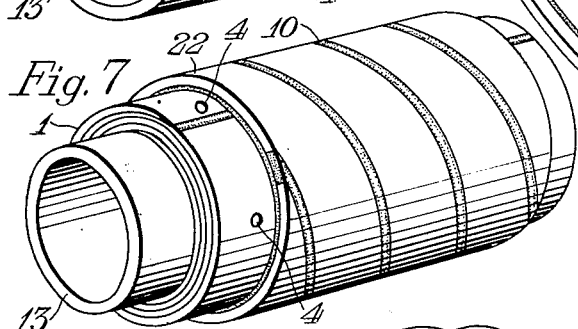
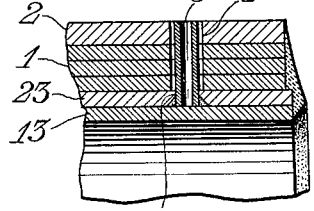
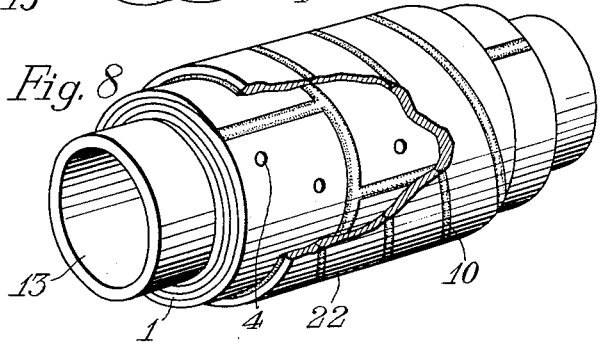

United States Patent Office

3,163,183
Patented Dec. 29, 1964

3,163,183
MULTI-LAYER PIPES
Hideo Sagara, Hiroshima, Japan, assignor to Mitsubishi Shipbuilding & Engineering Co., Ltd., Tokyo, Japan, a company of Japan
Filed May 16, 1961, Ser. No. 110,428
Claims priority, application Japan, May 17, 1960, 35/24,139; Oct. 7, 1960, 35/40,535; Apr. 18, 1961, 36/13,470
10 Claims. (Cl. 138—144)

This invention relates to a multi-layer pipe especially suitable for use with pressure instrument wherein the main part consits of multi-layer body of a spiral band plate coil having the inside and outside diameters fixed and with its inner part pre-compressed while its outer part is pre-tensioned and/or with fluid escaping openings extending therethrough except for the inner peripheral part.

Seamless pipes or welded pipes of a single ply or many overlapped plies have so far been used for pipes for pressure vessel barrels and pressure machines. However, a single-ply pipe is liable to longitudinally crack and its burst is difficult to be anticipated. In the conventional multi-layer pipes, it is so difficult to make fit tolerance of adjacent unit pipes or tension of the respective unit pipes proper that a material of comparatively large elongation must be used and, before the pipe is used for a pressure vessel, an excess pressure must be applied to the pipe to plastically deform it so that the stress during use may be uniform.

Specifically, in the manufacture of conventional multi-layer welded pipes, it is usual that plates are concentrically and cylindrically rolled up on the outer peripheries of respective inner unit pipes and that the abutting edges of the respective unit pipes are welded. However, as they are welded on one side, it is difficult to perfectly work and inspect them. In case the adjacent unit pipes are secured together by welding, when the above mentioned excess pressure is applied, if there is a slip between the respective unit pipes, the welded part will be subjected to overwork and breaks will be liable to be caused. Further, it is very difficult to inspect and repair such breaks. After all, the safety in strength is very low. Moreover, as the plate must be cut and welded for each layer or unit pipe, there is a defect that the processing cost is high.

In order to eliminate such defects, there has been suggested a method wherein a long wide steel band, which is made by welding steel plates or band steel, aftertreating the welded parts and removing the strain, is rolled up into a spiral coil to form a pressure-proof pipe. However, the fastening at the beginning and end of rolling of the coil is so liable to become loose that a cylinder or a band is fitted on the outer periphery of the coil and rollers are applied to the coil from its inside and outside to roll the coil, whereby the degree of close contact between the layers of the coil may be uniform. In such case, however, as there can be applied no pretension to the vicinity of the outer periphery nor any pre-compression to the vicinity of the inner periphery, it is impossible to uniform the stress during the use as a pressure vessel.

One of the main objects of the present invention is to provide a safe pressure-proof multi-layer pipe capable of keeping the smallest uniform tensible stress when subjected to an internal pressure during the use by applying a pretension to the vicinity of the outer periphery and a pre-compression to the vicinity of the inner periphery.

Another of the main objects of the present invention is to provide a multi-layer pipe which comprises a spiral band plate coil and a suitable number of fluid escaping openings, extending through the intermediate part and the outer peripheral part but not through the inner peripheral part, thereby to eliminate occurrence of strong internal pressure which might cause burst of the pipe.

According to a method, in making the multi-layer pipe by pressing the plies of a spiral band plate coil against each other during fixing either of the inside diameter and therefore the inner peripheral length or the outside diameter and therefore the outer peripheral length, said coil being pressed by rollers so that its radius of curvature may be larger than that of the true circle after completion, a part having the larger radius of curvature when rolled being held from inside and outside by the rollers so that the plies of said coil may be pressed together and then the outside diameter or inside diameter which is left unfixed is now fixed whereby a strong pressure-proof multi-layer rolled pipe may be obtained. The fixing of the inside diameter or outside diameter of said spiral band plate coil is carried out by welding of the end part of the band plate coil and the coil itself, by a cylinder to be inserted into or fitted on the band plate coil or by another concentrically adjacent spiral band plate coil. Needles to say, said cylinder to be inserted into or fitted on the coil may be any of a drawn seamless pipe, a welded pipe and a pipe made of a helically rolled band plate.

The multi-layer pipe according to the present invention has a proper number of openings such as holes or clearances for passing fluids, said openings extending through the outer peripheral part and intermediate part but not through the inner peripheral part of the spiral band plate coil so as not to be subjected to excess fluid pressure which might burst the multi-layer pipe itself. Needless to say, the spiral band plate coil in such case may be rolled either by such special method as described above or by any known conventional method.

The multi-layer pipe according to the present invention may have a soft steel material welded to the side edges of at least one of said spiral band plate coil and cylinders in order to make conveniently a long multi-layer pipe by connecting and welding a plurality of pipes made of hard steel.

The multi-layer pipe according to the present invention may be provided with leakage detecting tubes in addition to the above mentioned openings so that any break of the inside cylinder may be easily and surely detected.

Other objects and advantages of the present invention will be apparent from the following detailed description, taken in connection with the accompanying drawings, in which:

FIGURE 1 is a schematic elevation showing an embodiment of the method of the present invention;

FIGURE 2 is a perspective view of a multi-layer rolled pipe formed by said method;

FIGURE 3 is a fragmental longitudinal sectional view in enlarged scale of the multi-layered rolled pipe of FIGURE 2;

FIGURE 4 is a fragmental perspective view in enlarged scale of one form of a band plate which is a blank of the multi-layer rolled pipe of the present invention;

FIGURE 5 is a perspective view showing another embodiment of a multi-layer pipe of the present invention;

FIGURE 6 is a fragmental longitudinal sectional view in enlarged scale of an other embodiment of the multi-layer pipe of the present invention;

FIGURE 7 is a perspective view showing still another embodiment of the multi-layer pipe of the present invention; and FIGURE 8 is a perspective view of the multi-layer pipe shown in FIGURE 7, with a part cut off.

In FIGURE 1, 1 is a multi-layer body of spiral band plate coil made, for example, by rolling up a band steel spirally in the rolling direction. An outer cylindrical part 2 of the multi-layer body is formed by welding the outer end edge portion of the band plate to the coil itself. Therefore, the outer diameter or the outer peripheral length of the multi-layer body 1 is fixed. The chain line in the drawing shows the outer periphery after the body has been shaped in true circle. Now, the multi-layer body of spiral band plate coil 1 is supported by a certain number, for example three, of outer rollers R and is at the same time pressed inwardly so as to locally form parts of radii of curvature larger than the radius of curvature as to the true circle, as shown by the solid lines. An inner roller R' is pressed into contact with the inside of one of said parts or at the position opposite to one of said outer rollers and the multi-layer body 1 is rotated in the direction of the outwardly directed spiral of the coil. In such case, any roller may be driven.

Then, such multi-layer rolled pipe is more liable to be deformed than a single-layer pipe of the same thickness by the same force, the deformation being inversely proportional to the square of the number of layers. For example, a pipe of 15 layers will be deformed equally by a force of 1/225 of the force applied to a single-layer pipe of the same thickness. Therefore, even a rolling machine of a small capacity can easily give a required cold-deformation.

As the inner and outer rollers are thus rotated while maintaining the radius of curvature of the multi-layer body 1 locally larger than the radius of curvature of the completed true circle pipe, the inner and outer peripheries of the adjacent coil plies will come into close contact with each other and the inside coil ply will be rolled up in excess of the free length of the coil as completed. Therefore, in the free state as completed, there will be applied a pre-tension to the outer layer and a pre-compression to the inner layer. The magnitude of the stress can be freely controlled by the degree of depression or the amount of deformation of the coil plies.

Now, after the predetermined rolling up has been completed, the inside end edge portion of the spiral band plate may be hermetically welded to the coil itself to form an inner cylindrical part 3. Alternatively an inner tube, not illustrated, may be inserted into the inner cylindrical part and pressed to be expanded so that the inner tube may be in a state of compression.

As a modification of the above method, the outer diameter or the outer peripheral length of the multi-layer body 1 may be fixed by fitting on the outside of the multi-layer body a cylinder or a sleeve made of a helically rolled band plate at least both ends of which welding or other means for preventing loosening is applied to, instead of welding of the outer end edge portion of the band plate to the coil itself as described above. The multi-layer body 1 may be deformed by a plurality of inner rollers instead of the outer rollers. Further, contrary to the above, the inner diameter or the inner periphery of the multi-layer body may be fixed and, while the multi-layer body is being pressed by outer rollers, the part of radius of curvature larger than that of the true circle may be locally held by an inner roller and an outer roller, and the inner roller may be rotated in the direction of the inwardy directed spiral of the coil so that the adjacent layers of the body may be pressed into contact with each other and there may be given a pre-tension to the outer ply part and a pre-compression to the inner ply part. Therefore, when thus formed multi-layer rolled pipe is subjected to an internal pressure, the uniform, least tensile stress will be produced.

Now, in case the multi-layer pipe thus formed is used as a mechanical member to which internal pressure is applied, when the pressure fluid leaks in spaces between the plies of the coil, the pressure will be applied up to the vicinity of the outer periphery of the coil and will break the pipe. It is therefore necessary to provide openings such as clearances or holes through which the fluid will escape so as to make the pressure communicate with the outside lest it should be accumulated between the plies. FIGURE 3 shows such openings 4 in cross-section. Thus, even if the high pressure fluid leaks out of the inside, it will flow out through said openings. Therefore, the apparatus can be effectively and surely prevented from bursting.

Further, in the case that a long multi-layer pipe is to be made by welding and connecting a plurality of such multi-layer rolled pipes, when a hard steel material which must be heat-treated after welding operation is used as a material for at least any one of the respective cylinders and/or the band plate coils, a soft steel material may be welded to its edges. FIGURE 4 shows a band plate as edged with a soft steel material 5. If a long pressure-proof multi-layer pipe is made by welding and connecting a plurality of such multi-layer rolled pipes of a fixed length, there will be no need of heat-treatment after connecting them but annealing which will remove somewhat the welding stress will be required to be effected, resulting in advantage.

Further, if a metal member 6 may be conveniently welded to each end of the multi-layer rolled pipe so as to leave between the member and the adjacent multi-layer rolled pipe a space suitable for effecting welding operation.

Needless to say, the above described various modifications may be applied to the following embodiments.

The embodiment shown in FIGURE 5 will now be described. 12 is the outermost outside cylinder formed by cylindrically bending a comparatively thick plate and welding the adjacent longitudinal edge portions thereof to be jointed or by cutting a seamless pipe in a suitable length. 1 is a multi-layer body of spiral band plate coil inserted into the ouside cylinder 12. Said multi-layer body of spiral band plate coil 1 may be made by rolling up the plate by the aforementioned method or by merely rolling up the plate. Its outer end is strongly pressed against the inside surface of the outside cylinder 12 and its inner end is secured as by welding to the inner peripheral surface of the body. 13 is an inside cylinder made by cylindrically bending a plate material of a suitable thickness and welding the jointing edges at both longitudinal ends of the plate as in the case of said outside cylinder 12. The outer peripheral length of the inside cylinder is made somewhat larger than the inner peripheral length of said multi-layer body of spiral band plate coil. Therefore, in the case that said inside cylinder 13 is to be inserted into the multi-layer body of band plate coil 1, the inside cylinder 13 as deformed in concave is inserted and then expanded to be cylindrical by applying an internal pressure thereto. 4 is the same fluid opening as in the embodiment shown in FIGURE 2. Such openings 4 extend through the outside cylinder 12 and multi-layer body 1 to reach the outer peripheral surface of the inside cylinder 13.

In case the thickness of the band plate of the multi-layer body 1 disposed between the outside cylinder 12 and the inside cylinder 13 is somewhat large in this embodiment, wedge-shaped spacings will be, as clear in FIGURE 5, formed on the junctions between both cut ends of the band plate of the multi-layer body 1 and the outside cylinder 12 and the inside cylinder 13 respectively. Therefore, wedge-shaped packings whose thickness is gradually reduced over its length as large as several times the thickness as indicated at 7 and 8 may be used. Alternatively the end portions themselves of said band plate may be made gradually thinner in the form of wedge.

Further, if the connection of two band plates having different thicknesses are used, the end portion of the thicker plate may be preferably made gradually thinner over its length as large as several times the difference in thicknesses.

When a band plate of any required width is not available, a suitable number of band plates of suitable width may be connected to make a coil having required width.

Further, in the embodiment shown in FIGURE 6, the first inside cylinder 23 is fitted in the multi-layer body of spiral band plate coil 1. The fluid escaping holes 4 reaching the outer surface of said first inside cylinder 23 are made and a tube hole 14 of a diameter smaller than that of said fluid escaping hole 4 is made concentrically with the escaping hole. A detecting tube 9 is secured in said tube hole. The second inside cylinder 13 subjected directly to the fluid pressure is fitted in said first inside cylinder 23. If said second inside cylinder 13 is broken, the fluid leaked thereby will be directly taken out through said detecting tubes 9 and therefore the occurrence of any break can be detected surely and easily within a period of very short time.

In some case, one or more intermediate cylinders can be disposed between the outside cylinder and the inside cylinder subjected directly to the fluid pressure and a multi-layer body of band plate coil can be fitted between said respective cylinders.

In the embodiment illustrated in FIGURE 5, the multi-layer body of band plate coil 1 is inserted into the outside cylinder 12 and the inside cylinders 13 are successively inserted into said multi-layer body 1 to form a multi-layer pipe. However, the manufacturing process may be reversed. In other words, the multi-layer body of band plate coil 1 may be pressed against the outer periphery of the inside cylinder 13 in the similar manner as above mentioned and the outside cylinder 12 may be fitted on the outside of the multi-layer body 1 to cover the same.

The embodiment illustrated in FIGURES 7 and 8 is a long multi-layer pipe. 13 is an inside cylinder to hermetically contain a pressure fluid and to be directly subjected to the fluid pressure. It is formed of a single long drawn seamless pipe or by longitudinally connecting a plurality of short pipes to be of any desired length. It may also be formed by helically rolling a band plate material of suitable width, hermetically and toughly welding the bias abutting edges of the plate and sufficiently after-treating them.

On the outer periphery of the inside cylinder 13 formed as above described, the multi-layer body of spiral band plate coil 1 is disposed which has been made by rolling the band plate of a suitable width on said outer periphery under tension or under preheating and expansion. The outer end edge of the multi-layer body is secured as by welding onto the outer peripheral surface of the coil itself whereby the same is prevented from loosening.

Now, if the width of each spiral band plate coil is smaller than the length of the desired multi-layer pipe the adjacent abutted parts of the respective unit coils may be welded together while a plurality of band plates are being rolled up in series along the axis of the coil or after they have been rolled up. When the adjacent band plates are welded to each other while they are being rolled up as described above, it will not be necessary to apply to the ends of the rolled band plate a welding metal shaped in a configuration which provides a space suitable for effecting welding operation as illustrated in FIGURE 3. Further, in case the band plates are rolled up and then adjacent ones are welded each other, if the band plates are rolled up after subjecting them to side-trimming so as to make the widths of the plates smaller in proportion to the rolling length, said space will be formed as desired.

22 is a sleeve formed of a comparatively narrow band plate helically rolled substantially throughout the length of said multi-layer body of spiral band plate coil. Means for surely preventing the sleeve from loosening are applied to both ends of the sleeve. Further, if necessary, the bias abutting edges 10 may be preferably connected together continuously or intermittently as by welding in order to prevent loosening.

Thus, in this embodiment of the multi-layer pipe, the multi-layer body of spiral band plate coil 1 is rolled up on the outer periphery of long inside cylinder 13 to be of pressure-proof construction having any required thickness the long inside cylinder 13 and includes the sleeve 22 of helically rolled band plate applied onto the outer periphery of the same so that multi-layer pipe comprises a plurality of layers of the band plates compositely rolled up on the inside cylinder. Therefore, any desired pipe can be easily produced having a length sufficiently large as compared with the inner diameter thereof and simultaneously desired strength and toughness.

In this embodiment of the multi-layer piper, openings for fluids such as previously described may be provided.

This embodiment illustrates a long composite multi-layer pipe. In case a plurality of spiral band plate coils are rolled up in series on the long inside cylinder 13 the abutted portions of the adjacent coils may be left unwelded and the band plate is helically and continuously rolled up on the outside of the coils followed by suitable prevention of loosening. Then the cutting of the resulting pipe along the joints of said spiral band plate coils will yield many composite multi-layer pipes.

As the above described sleeve is formed of a helical band plate, the same has no joint in the longitudinal direction resulting in high safety. If, as described above, the joints except for those at the beginning and end of the rolling are left unwelded, small spacings or clearances formed on the joints will serve as openings for escaping fluid and therefore only the multi-layer body of spiral band plate coil may be provided with fluid escaping holes.

In summary, the multi-layer pipe according to this embodiment is not required to be fully hermetically or rigidly welded in the longitudinal direction at the beginning and end of the rolling of the spiral coil, but the beginning and end of the rolling of the outer helical coil may only be peripherally welded to prevent loosening. Therefore, the welded length is much shorter than in any known pipe and the strength of the weld is not critically required. Thus, the design and manufacture are easier, the manufacturing cost is lower and comparatively longer multi-layer pipes can be provided.

While the invention has been described in conjunction with the preferred embodiments thereof it is to be understood that numerous changes and modifications may be made without departing from the spirit and scope of the invention.

What I claim is:

1. A multi-layer pipe for fluids under pressure comprising a single strip spirally wound in the form of a coil, each layer of said coil being in intimate contact with the adjacent layer, means for fixing the outside diameter and the inside diameter of said coil, and a plurality of fluid-escaping openings extending through all the layers of the pipe except the innermost layer thereof.

2. A multi-layer pipe comprising a single strip spirally wound in the form of ac oil, each layer of said coil being in intimate contact with the adjacent layer, and both end portions of said coil being welded to the adjacent layers whereby the outside and inside diameters of said coil are respectively fixed, and a plurality of fluid-escaping openings extending through all the layers of the pipe except the innermost layer thereof.

3. A multi-layer pipe for fluids under pressure comprising a single strip spirally wound in the form of a coil, each layer of said coil being in intimate contact with the adjacent layer, a cylindrical member disposed in intimate contact with at least one of the outer and inner peripheries of said coil, that end portion of said coil contacting said cylindical member being wedge-shaped so as to substantially leave no void therebetween, and a plurality of fluid-escaping openings extending through said cylindrical member and all the layers of the coil except the innermost layer of the pipe.

4. A multi-layer pipe comprising a single strip spirally wound in the form of a coil, each layer of said coil being in intimate contact with the adjacent layer, means for fixing the outside diameter and the inside diameter of said coil, an easily weldable weld metal deposited on at least one end face of said pipe, and a plurality of fluid-escaping openings extending through all the layers of the pipe except the innermost layer thereof.

5. A multi-layer pipe for fluids under pressure comprising a single strip of hard steel having its longitudinal edges form with an easily weldable material and spirally wound in the form of a coil, each layer of said coil being in itimate contact with the adjacent layer, means for fixing the outside diameter and the inside diameter of said coil, and a plurality of fluid escaping openings extending through all the layers of the pipe except the innermost layer thereof.

6. A multi-layer pipe for fluids under pressure comprising a single strip spirally wound in the form of a coil, each layer of said coil being in intimate contact with the adjacent layer, an outer cylindrical member including a single narrow strip helically wound around the outer periphery of said coil with a small gap left between the facing edges of the wound narrow strip, means at both ends of said cylindrical member for preventing lossening of the same, and a plurality of fluid-escaping openings extending through all the layers of said coil except the innermost layer of said pipe.

7. A multi-layer pipe for fluids under pressure comprising a plurality of multi-layer pipe portions interconnected in tandem, each of said multi-layer pipe portions consisting of a single strip spirally wound in the form of a coil, each layer of said coil being in intimate contact with the adjacent layer, at least the inside diameters of said pipe portions being fixed by a common cylindrical member, and a plurality of fluid-escaping openings extending through all the layers of said pipe except said common cylindrical member.

8. A multi-layer pipe for fluids under pressure comprising a plurality of multi-layer pipe portions interconnected in tandem, each of said multilayer pipe portions consisting of a single strip spirally wound in the form of a coil, each layer of said coil being in intimate contact with the adjacent layer, at least the outside diameters of said pipe portions being fixed by a common cylindrical member formed of a single narrow strip helically wound around the outer peripheries of said pipe portions, and a plurality of fluid-escaping openings extending through all the layers of said coils except the innermost layer of the pipe.

9. A multiple-layer pipe comprising a single strip spirally wound in the form of a coil, each layer of said coil being in intimate contact with the adjacent layer, means for fixing the outside diameter and the inside diameter of said coil respectively, a cylindrical member intimately contacted with each other being disposed in intimate contact with the inner periphery of said coil, and a plurality of fluid-escaping openings extending through the layers of the pipe except for the innermost layer thereof including a plurality of tubes hermetically lining said plurality of fluid-escaping openings to prevent any fluid leak through the innermost layer of the pipe from entering the interfaces of the layers.

10. A multi-layer pipe for fluids under pressure, comprising a single sheet spirally wound in the form of a coil with a plurality of convolutions forming pipe layers in intimate contact with one another, end edge portions of said coil being secured to the adjacent convolutions whereby the outside and inside diameters of said coil are respectively fixed, at least the inner convolution of said coil being in compression in a circumferential direction and at least the outer convolution of said coil being under tension in a circumferential direction, and a plurality of fluid-escaping openings extending through all of the layers of the pipe except the inner layer thereof.

References Cited by the Examiner
UNITED STATES PATENTS

| | | | |
|---|---|---|---|
| 441,884 | 12/90 | Meyer | 29—473.9 |
| 1,883,662 | 10/32 | Fisher | 29—421 |
| 1,963,745 | 6/34 | Ingersoll | 29—473.9 |
| 2,337,247 | 12/43 | Kepler | 29—446 |
| 2,380,107 | 7/45 | Hobrock | 138—171 |
| 2,866,480 | 12/58 | Snively | 138—171 |

EDWARD V. BENHAM, *Primary Examiner.*

LEWIS J. LENNY, *Examiner.*